United States Patent [19]
Hopson et al.

[11] Patent Number: 5,893,801
[45] Date of Patent: *Apr. 13, 1999

[54] SEGMENTED CROSS GROOVE PLUNGING CONSTANT VELOCITY JOINT

[75] Inventors: Michael Walter Hopson; Robert Sams; Daniel J. Schmidt, all of Clinton Township, Mich.

[73] Assignee: Ford Motor Company, Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/741,633

[22] Filed: Nov. 4, 1996

[51] Int. Cl.[6] .................................... F16D 3/223
[52] U.S. Cl. .................. 464/144; 464/170; 464/906
[58] Field of Search .......................... 464/141, 142, 464/143, 144, 170, 185, 906

[56] References Cited

U.S. PATENT DOCUMENTS

| | | | |
|---|---|---|---|
| 2,615,317 | 10/1952 | Rzeppa | 464/906 X |
| 3,083,548 | 4/1963 | Zeidler | 464/144 |
| 3,287,934 | 11/1966 | Asher | 464/906 X |
| 3,691,790 | 9/1972 | Simister | 464/167 |
| 3,801,171 | 4/1974 | Rozentals . | |
| 4,006,946 | 2/1977 | Mann et al. . | |
| 4,020,648 | 5/1977 | Krude | 464/146 |
| 4,126,361 | 11/1978 | Bottner et al. . | |
| 4,236,386 | 12/1980 | Yates et al. | 464/181 |
| 4,591,212 | 5/1986 | Balken et al. . | |
| 4,708,498 | 11/1987 | Labedan et al. . | |
| 5,067,929 | 11/1991 | Krude . | |
| 5,086,560 | 2/1992 | Glazier . | |
| 5,102,241 | 4/1992 | Pflungner . | |
| 5,217,308 | 6/1993 | Schroeder . | |
| 5,222,914 | 6/1993 | Mazziotti . | |
| 5,288,273 | 2/1994 | Krude . | |
| 5,368,523 | 11/1994 | Mazziotti . | |
| 5,405,201 | 4/1995 | Senger . | |
| 5,433,668 | 7/1995 | Harz et al. . | |
| 5,451,185 | 9/1995 | Krude et al. . | |
| 5,453,052 | 9/1995 | Harz et al. . | |

FOREIGN PATENT DOCUMENTS

| | | | |
|---|---|---|---|
| 65331 | 11/1982 | European Pat. Off. | 464/141 |
| 209282 | 1/1929 | United Kingdom | 464/170 |
| 2076936 | 12/1981 | United Kingdom | 464/144 |

Primary Examiner—Daniel P. Stodola
Assistant Examiner—Gregory J. Strimbu
Attorney, Agent, or Firm—James J. Dottavio

[57] ABSTRACT

A constant velocity joint race includes a shaft and a plurality of track segments having a ball race surface formed thereon. Each of the segments is arranged circumferentially in an abutting manner with an adjacent track segment on either side. The segments are secured to the shaft and one another.

20 Claims, 2 Drawing Sheets

5,893,801

1

SEGMENTED CROSS GROOVE PLUNGING CONSTANT VELOCITY JOINT

BACKGROUND OF THE INVENTION

1. Field of the Invention

The present invention relates to the field of cross groove plunging constant velocity joints.

2. Discussion of the Prior Art

Cross groove plunging constant velocity joint races of the prior art require a series of operations to form the inner and outer races, and further operations to finish the races to provide an acceptable bearing surface. U.S. Pat Nos. 5,222, 914 and 5,368,523 to Mazziotti demonstrate efforts to provide replaceable inserts for ball grooves in a constant velocity joint. The inserts comprise semicircular pieces which are retained within recesses of a hub member using a clamping method, where a retaining ring axially retains the inserts in recesses of the race using a plurality of bolts to hold the ring against the hub member.

The bearing designs shown in the Mazziotti patents listed above require the inserts to be precisely machined on the inside diameter to form the raceway. These inserts require further precise machining operations to form the outer surface to fit in the recesses of the joints. Furthermore, the length of the inserts is a critical dimension, as are the width of the retaining ring and the torque on the bolts to retain the inserts, as these characteristics will affect the play in the bearing assembly.

It would be desirable to provide a constant velocity joint having a plurality of race members usable in a state requiring a minimum number of dimensional controls in finished operations, and in particular, a race member which is usable as-formed without subsequent finishing operations.

SUMMARY OF THE INVENTION

A cross groove plunging constant velocity joint according to the present invention is provided having a plurality of track segments having a ball race surface formed thereon arranged circumferentially in an abutting manner with an adjacent track segment on either side.

An object of the present invention is to provide a constant velocity joint with a minimal number of dimensional controls. An advantage of the present invention is that a constant velocity joint includes a plurality of race members usable in a state requiring a minimum number of dimensional controls in finishing operations, and in particular, a race member which is usable as-formed without subsequent finishing operations. Thus, the cost to manufacture such a joint is minimized, as finishing operations are eliminated or minimized. The forming operations are also simplified, as the shape of the track segments allows for a forming operation to strike the segments normal to the axis of rotation, thereby simplifying the tooling and the processes to form the race.

These advantages and objectives are realized in a constant velocity joint having a shaft and a plurality of track segments having a ball race surface formed thereon. Each of the segments is arranged circumferentially in an abutting manner with an adjacent track segment on either side. The segments are secured to the shaft.

2

Figure 1:
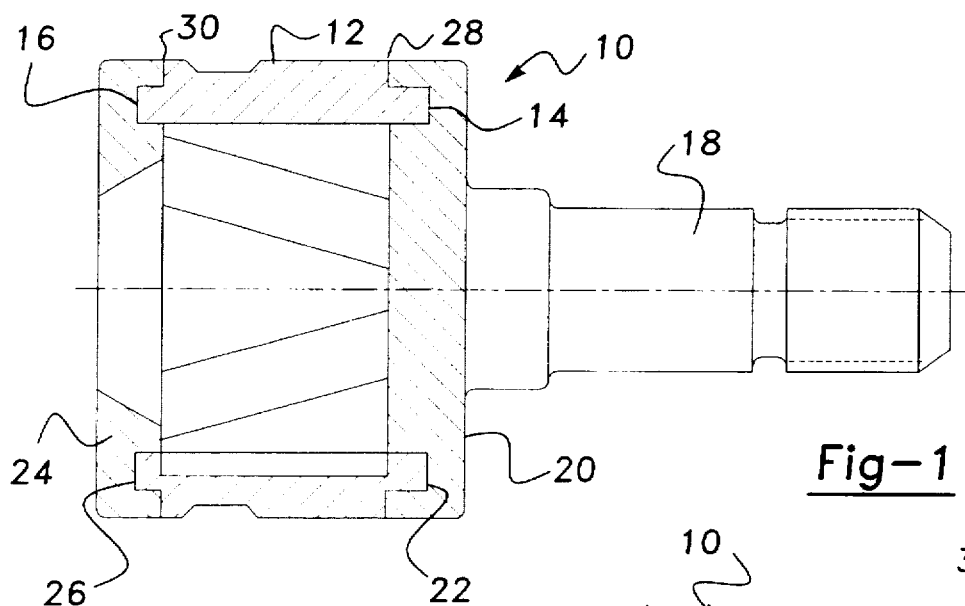
FIG. 1 is a partial cross-sectional side view of an outer race of a constant velocity joint according to the present invention.
Figure 2:
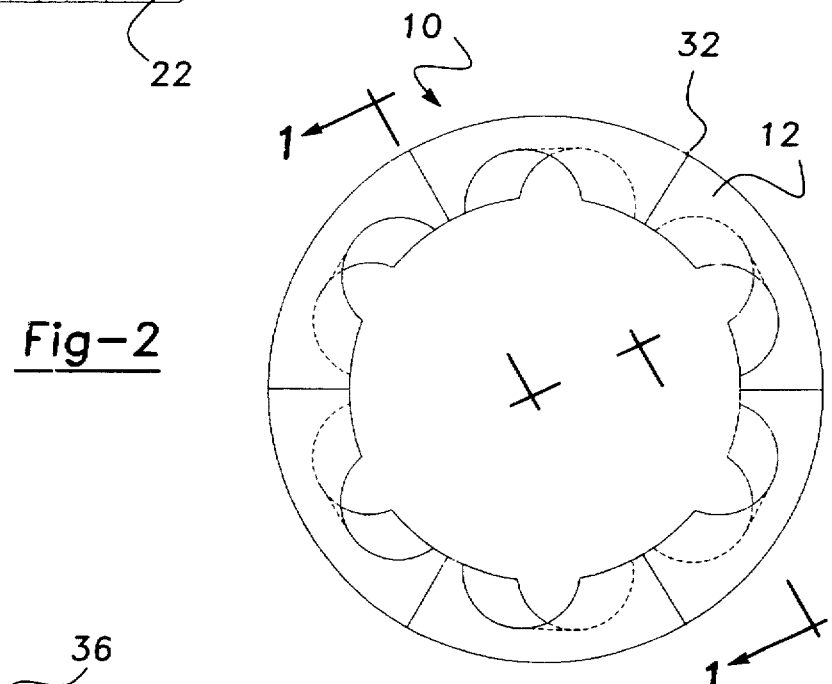

FIG. 2 is an end view of an outer race of a constant velocity joint as shown in FIG. 1.

Figure 3:
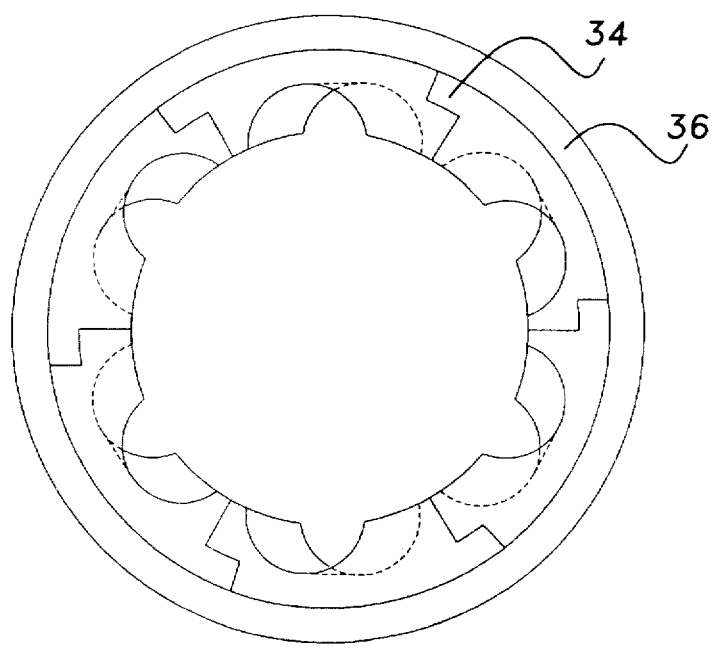

FIG. 3 is a partial cross-sectional side view of an alternative embodiment of an outer race according to the present invention.

Figure 4:
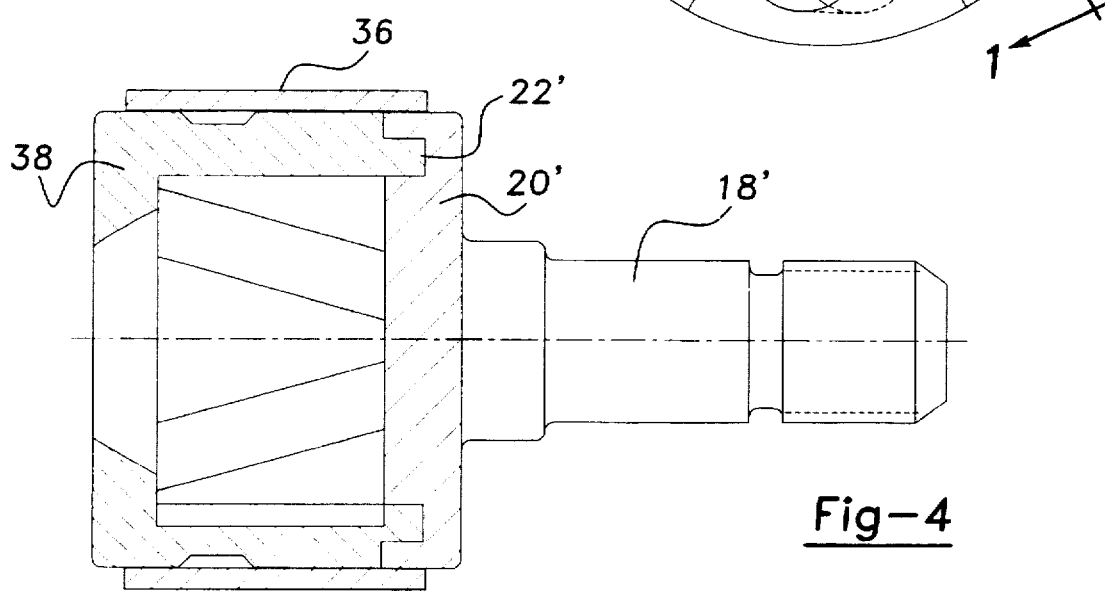

FIG. 4 is an end view of an outer race of a constant velocity joint as shown in FIG. 3.

Figure 5:
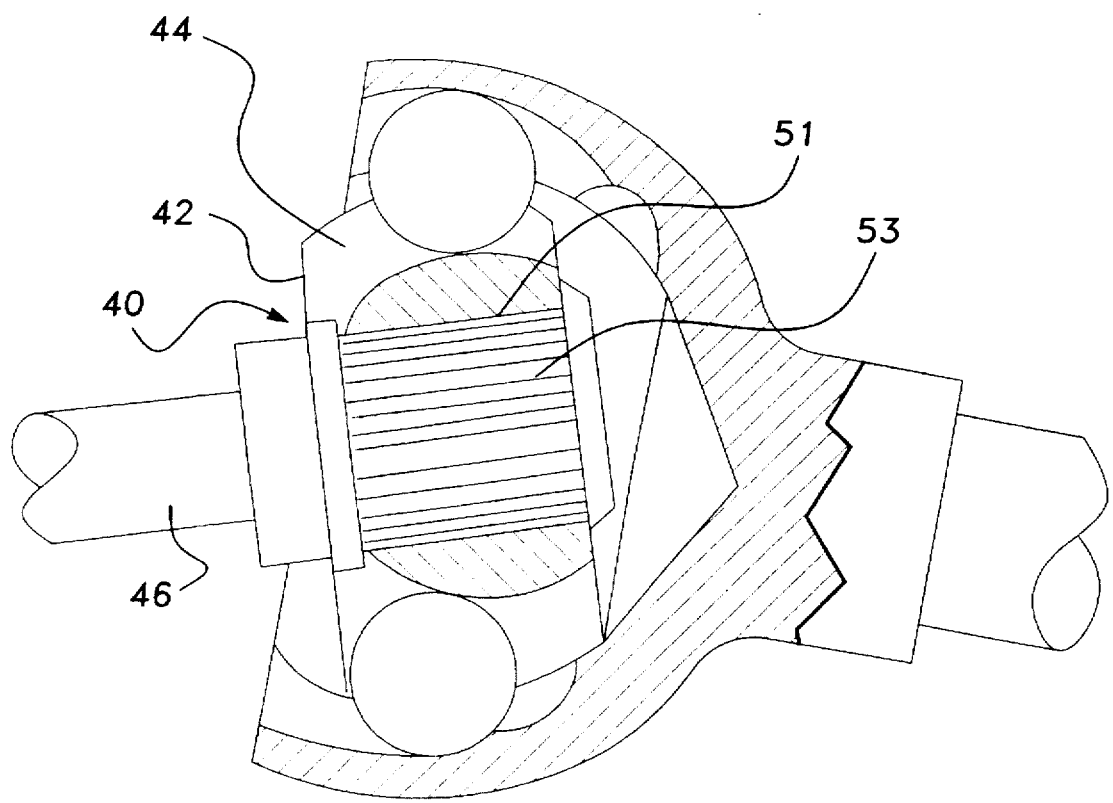

FIG. 5 is a partial cross-sectional view of a constant velocity joint assembly.

DETAILED DESCRIPTION OF PREFERRED EMBODIMENTS

In FIG. 1, an outer race 10 of a constant velocity joint is shown. The race 10 is a multiple piece construction comprising a plurality of partial cylindrical track segments 12. These segments 12 are arranged as shown in FIG. 2 circumferentially arranged to form a complete outer race 10 for a constant velocity joint. As shown in FIG. 1, each of the segments 12 has a T-shaped cross section from an end view, comprising a flange 14, 16 at either end of each segment 12. The outer race 10 further comprises a stem 18, which includes a flange 20 having an annular groove 22 formed therein. As shown in FIG. 1, a flange 14 at a first end of each track segment 12 is assembled into the groove 22 of the flange 20. An end cap ring 24 is provided at the second end 16 of the track segments 12. The cap ring 24 includes a second annular groove 26, which engages the second flange 16 at the second end of the track segments 12. The assembly of the stem flange 20, the track segments 12, and the end cap 24 comprises outer race 10 of a cylindrical outer CV joint.

In a preferred embodiment, once the above components are assembled into the cylindrical outer race 10 of outer CV joint, the assembly is welded. The weldment includes a circumferential weld 28, 30 at either flange end as well as a seam weld along the seam 32 between the track segments 12. Preferably, a laser is used to perform the welds described above.

In an alternative embodiment, the track segments include an interlocking flange 34 between the segments 12 as viewed from an end view, as shown in FIG. 3. In a further alternative embodiment, a sleeve 36 is provided around the perimeter of the track segments 12, as shown in FIG. 4. The track segments, as shown in FIG. 4, include an L-shaped cross section at the end 38 opposite the stem flange 18', thereby eliminating the need for the end cap ring 24 shown in FIG. 1. The embodiment shown in FIG. 4 retains the engagement in the annular groove 22' of the flange 20' carried by the stem 18'.

As shown in FIG. 5, an inner race 40 of a constant velocity joint may be formed in a similar manner. In this embodiment, the inner race 40 is formed using a plurality of partial cylindrical track segments 42 having a ball track groove 44 on the outer surface of the inner race 40. The interlocking formation of these segments 42 is accomplished in the manner described above for the outer race 10, wherein the segments 42 are arranged circumferentially and welded at the interface between the segments 42. The segments 42 are then installed onto a splined shaft 46. Alternatively, the segments 42 may be arranged about the shaft 46, then welded, or further welded to the shaft 46 itself to eliminate or reduce the need for splines 51, 53 on the segments 42 and shaft 46.

In each of the embodiments of the present invention, the configuration of the race surfaces is such that the track section segments are usable as-formed, without further finishing operations such as grinding, polishing, etc. The as-formed processes include cold forming such as forging, powdered metallurgy, casting, or any other such forming operations known in the art. Using the track segments in the as-formed state is particularly important in the outer race where the race surfaces are formed on the inner surface of the segments and subsequent finishing operations are difficult and expensive. In prior art constant velocity joints, these internal race surfaces are typically formed in a unitary race member, then the race surfaces are internally finish machined.

It is understood that the specific mechanisms and techniques which have been described are merely illustrative of preferred application of the principles of the invention. Numerous modifications may be made to the method and apparatus described herein without deviating from the true spirit and scope of the invention.

We claim:

1. A constant velocity joint comprising:
   a shaft having an axis of rotation, a flange at one end of said shaft, said flange having a substantially U-shaped annular groove formed therein; and
   a plurality of track segments, each of said segments having a ball race surface formed thereon and two sides, each of said segments being arranged circumferentially about said shaft axis of rotation, each said side of said segments abutting a respective one of the sides of an adjacent one of the track segments, each of the segments being secured mutually to one another and to said shaft, and each of said plurality of segments having an arcuate shape with an internal surface having said ball race surface formed thereon and a second flange at a first end of said segment engaged with a portion of the annular groove.

2. A constant velocity joint according to claim 1, wherein each of said track segments comprises a third and a fourth flange each arranged on a respective one of the sides of said segment, each of the third flanges overlapping a respective one of the fourth flanges.

3. A constant velocity joint according to claim 1, further comprising:
   an end cap having a second substantially U-shaped annular groove therein;
   each of said segments having an arcuate fifth flange at a second end thereof engaged with a portion of the second annular groove.

4. A constant velocity joint according to claim 3 wherein each of said segments is welded to the shaft flange, to the end cap, and to said adjacent one of said track segments.

5. A constant velocity joint according to claim 1, comprising:
   annular sleeve arranged around the segments to retain the segments in said abutting relationship.

6. A constant velocity joint according to claim 1, wherein each of the ball race surfaces comprises a cross-groove constant velocity joint raceway.

7. A constant velocity joint according to claim 6, wherein said constant velocity joint is assembled with the race surfaces formed on the segments without machining.

8. A constant velocity joint comprising:
   a shaft having an axis of rotation and a splined outer surface at one end of said shaft; and
   a plurality of track segments, each of said segments having a ball race surface formed thereon and two sides, each of said segments being arranged circumferentially about said shaft axis of rotation, each said side of said segments abutting a respective one of the sides of an adjacent one of the track segments, each of the segments being secured mutually to one another and to said shaft, and each of said segments having an arcuate shape with a splined internal surface mating with a portion of the splined outer surface of the shaft and an outer surface having said race surface formed thereon.

9. A constant velocity joint according to claim 8 wherein each of said segments is welded to said adjacent one of track segments.

10. A constant velocity joint comprising:
    a shaft having an axis of rotation and a flange at one end of said shaft, said flange having a substantially U-shaped annular groove formed therein; and
    a plurality of track segments, each of said segments having a ball race surface formed thereon and two sides, each of said segments being arranged circumferentially about the axis not rotation, each said side of said segments abutting a respective one of the sides of a adjacent one of the track segments, each of the segments being secured mutually to one another and to said shaft, each of the ball race surfaces comprises a cross-groove constant velocity joint raceway, and each of said plurality of segments having an arcuate shape with an internal surface having said ball race surface formed thereon and a second flange at a first end of said segment engaged with a portion of the annular groove wherein said constant velocity joint is assembled with the race surfaces formed on the segments without machining.

11. A constant velocity joint according to claim 10, wherein each of said track segments comprises a third and a fourth flange each arranged on a respective one of the sides of said segment, each of the third flanges overlapping a respective one of the fourth flanges.

12. A constant velocity joint race member comprising:
    a shaft having an axis of rotation;
    a plurality of track segments, each of said segments having a ball race surface formed thereon and two sides, each of said segments being arranged circumferentially about said axis of rotation, each said side of said segments abutting a respective one of the sides of an adjacent one of the segments, and each of the segments being welded to one another and to said shaft.

13. A constant velocity joint according to claim 12, wherein said constant velocity joint is assembled with the race surfaces formed on the segments.

14. A constant velocity joint according to claim 13, wherein each of said track segments comprises a third and a fourth flange each arranged on a respective one of the sides of said segment, each of the third flanges overlapping a respective one of the fourth flanges.

15. A constant velocity joint comprising:
    a shaft having an axis of rotation and a flange at one end of said shaft, said flange having a substantially U-shaped annular groove formed therein; and
    a plurality of track segments, each of said segments having a ball race surface formed thereon and two sides, each of said segments being arranged circumferentially about the axis of rotation, each said side of said segments abutting a respective one of the sides of an adjacent one of the segments, each of the segments being secured mutually to one another and to said shaft, and each of said plurality of segments having an arcuate shape with an internal surface having said ball race surface formed thereon and a second flange at a first end of said segment engaged with a portion of the annular groove wherein said constant velocity joint is assembled with the race surfaces formed on the segments.

16. A constant velocity joint comprising:

a shaft having an axis of rotation and a flange at one end of said shaft, said flange having a substantially U-shaped annular groove formed therein;

an end cap having a second substantially U-shaped annular groove therein;

a plurality of track segments, each of said segments having a ball race surface formed thereon and two sides, each of said segments being arranged circumferentially about said axis of rotation, each said side of said segments abutting a respective one of the sides of an adjacent one of the segments, each of the segments being secured mutually to one another and to said shaft, each of said segments having an arcuate shape with an internal surface having said ball race surface formed thereon and a second flange at a first end of said segment engaged with a portion of the annular groove of said shaft flange and each of said track segments comprises a third and a fourth flange each arranged on a respective one of the sides of said segment, each of the third flanges overlapping a respective one of the fourth flanges, and each of said segments having an arcuate fifth flange at a second end thereof engaged with a portion of the second annular groove.

17. A constant velocity joint according to claim 16 wherein each of said segments is welded to the shaft flange, to the end cap, and to the adjacent one of the segments.

18. A constant velocity joint comprising:

a shaft having an axis of rotation and a splined outer surface at one end of said shaft; and a plurality of track segments, each of said segments having a ball race surface formed thereon and two sides, each of said segments being arranged circumferentially about said shaft axis of rotation, each said side of said segments abutting a respective one of the sides of an adjacent one of the segments, each of the segments being secured mutually to one another and to said shaft, and each of said segments having an arcuate shape with a splined internal surface mating with a portion of the splined outer surface of the shaft and an outer surface having said race surface formed thereon wherein the constant velocity joint is assembled with the race surfaces formed on the segments.

19. A constant velocity joint according to claim 18 wherein each of said segments is welded to the adjacent one of the segments.

20. A constant velocity joint according to claim 19, wherein said constant velocity joint is assembled with the race surfaces formed on the segments without machining.

* * * * *